(12) United States Patent
Andersen

(10) Patent No.: US 8,477,388 B2
(45) Date of Patent: Jul. 2, 2013

(54) SCANNER WITH A SEPARATE FLATBED GLASS AND ADF GLASS

(75) Inventor: Eric L. Andersen, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 143 days.

(21) Appl. No.: 13/180,360

(22) Filed: Jul. 11, 2011

(65) Prior Publication Data

US 2013/0016407 A1 Jan. 17, 2013

(51) Int. Cl.
*H04N 1/04* (2006.01)

(52) U.S. Cl.
USPC ........... 358/474; 358/496; 358/497; 358/498; 358/486

(58) Field of Classification Search
USPC ................. 358/496, 497, 498, 474, 408, 494, 358/486, 400, 401, 500, 501, 505; 399/367, 399/379, 211, 212
See application file for complete search history.

(56) References Cited

U.S. PATENT DOCUMENTS

| | | | |
|---|---|---|---|
| 4,152,962 A | 5/1979 | Hendrischk | |
| 4,231,562 A | 11/1980 | Hori | |
| 4,834,557 A | 5/1989 | Dreinhoff | |
| 4,846,589 A | 7/1989 | Chikuma et al. | |
| 5,875,376 A | 2/1999 | Chou | |
| 7,016,088 B2 * | 3/2006 | Yokota et al. | 358/474 |
| 7,755,810 B2 * | 7/2010 | Kuse | 358/474 |
| 8,223,406 B2 * | 7/2012 | Osakabe | 358/474 |
| 8,300,282 B2 * | 10/2012 | Nakakita et al. | 358/474 |
| 2003/0081268 A1 * | 5/2003 | Hirayama | 358/474 |

FOREIGN PATENT DOCUMENTS

| | | |
|---|---|---|
| JP | 59126525 | 7/1984 |
| JP | 62025741 | 2/1987 |
| JP | 62109472 | 7/1987 |
| JP | 11178309 | 7/1999 |
| JP | 2008203679 | 9/2008 |

* cited by examiner

*Primary Examiner* — Cheukfan Lee
(74) *Attorney, Agent, or Firm* — Steven L. Webb

(57) ABSTRACT

A scanner is disclosed. The scanner has a flatbed glass and an ADF glass mounted to a top cover with a gap formed between the two glass pieces. The scanner has a scanner module that has an ADF scan position underneath the ADF glass and a flatbed scan position underneath the flatbed glass. When the scanner module is in the flatbed scan position the scanner module references the flatbed glass. The scanner module crosses the gap between the two glass pieces when the scanner module moves from the flatbed scan position to the ADF scan position. The scanner module is lowered away from the flatbed glass as the scanner module approaches and moves across the gap between the two glass pieces.

13 Claims, 3 Drawing Sheets

SCANNER WITH A SEPARATE FLATBED GLASS AND ADF GLASS

BACKGROUND

Some flatbed scanners have scan modules that have a short depth of field, for example a scan module that uses a Contact Image Sensor (CIS). The short depth of field requires close alignment between the scanning module and the scanning glass. One method used to maintain the alignment between the scanning module and the scanning glass is to allow the scanning module to ride on or reference the underside of the scanning glass. Many scanners come equipped with an Automatic Document Feeder (ADF). The most common type of ADF uses a second scan window. Typically a second piece of glass is used for the second scan window. When scanning with the ADF, the scanning module is moved underneath the second piece of glass.

DETAILED DESCRIPTION

Figure 1:
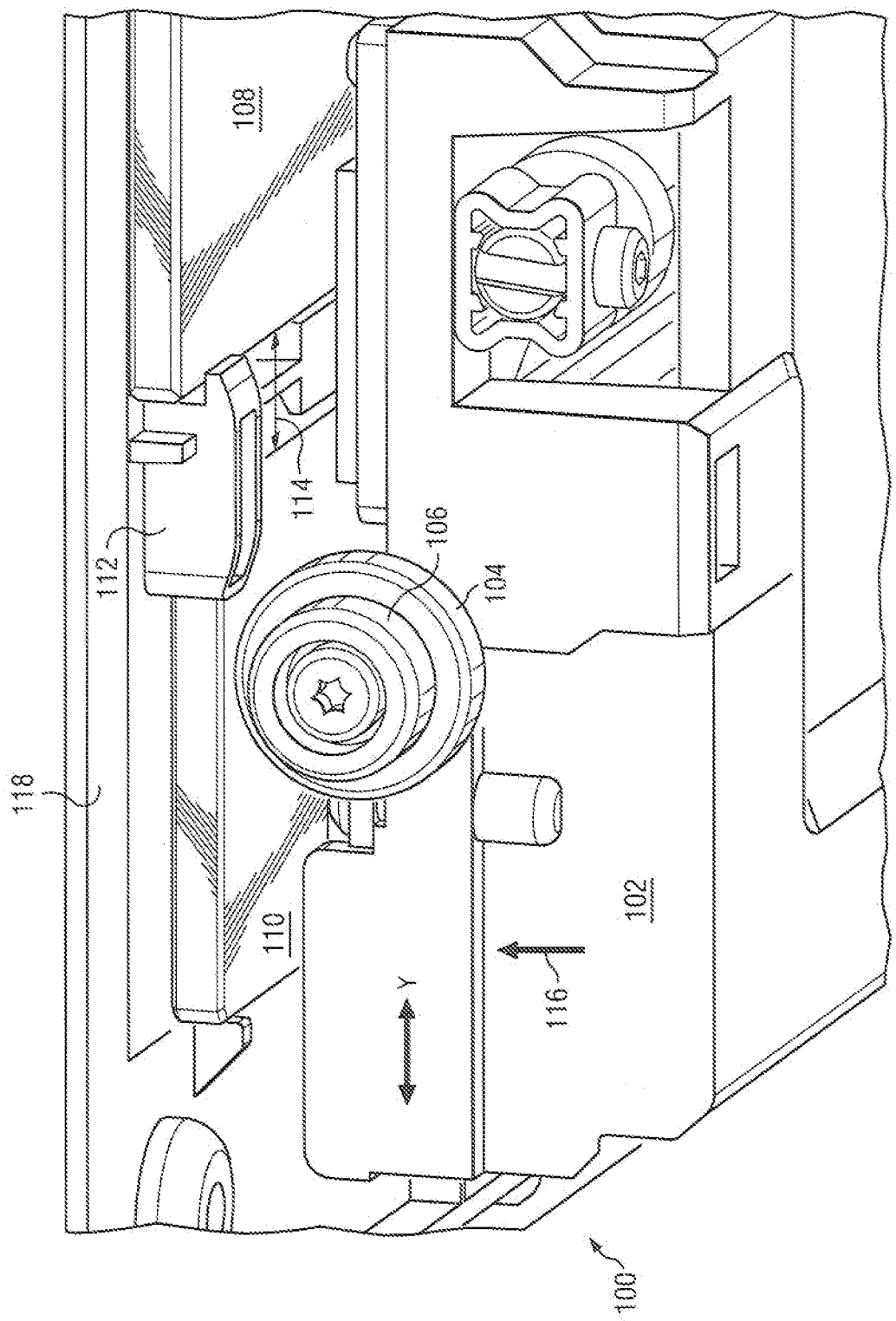
FIG. 1 is an isometric cutaway side view of a scanner 100 in an example embodiment of the invention.
Figure 2:
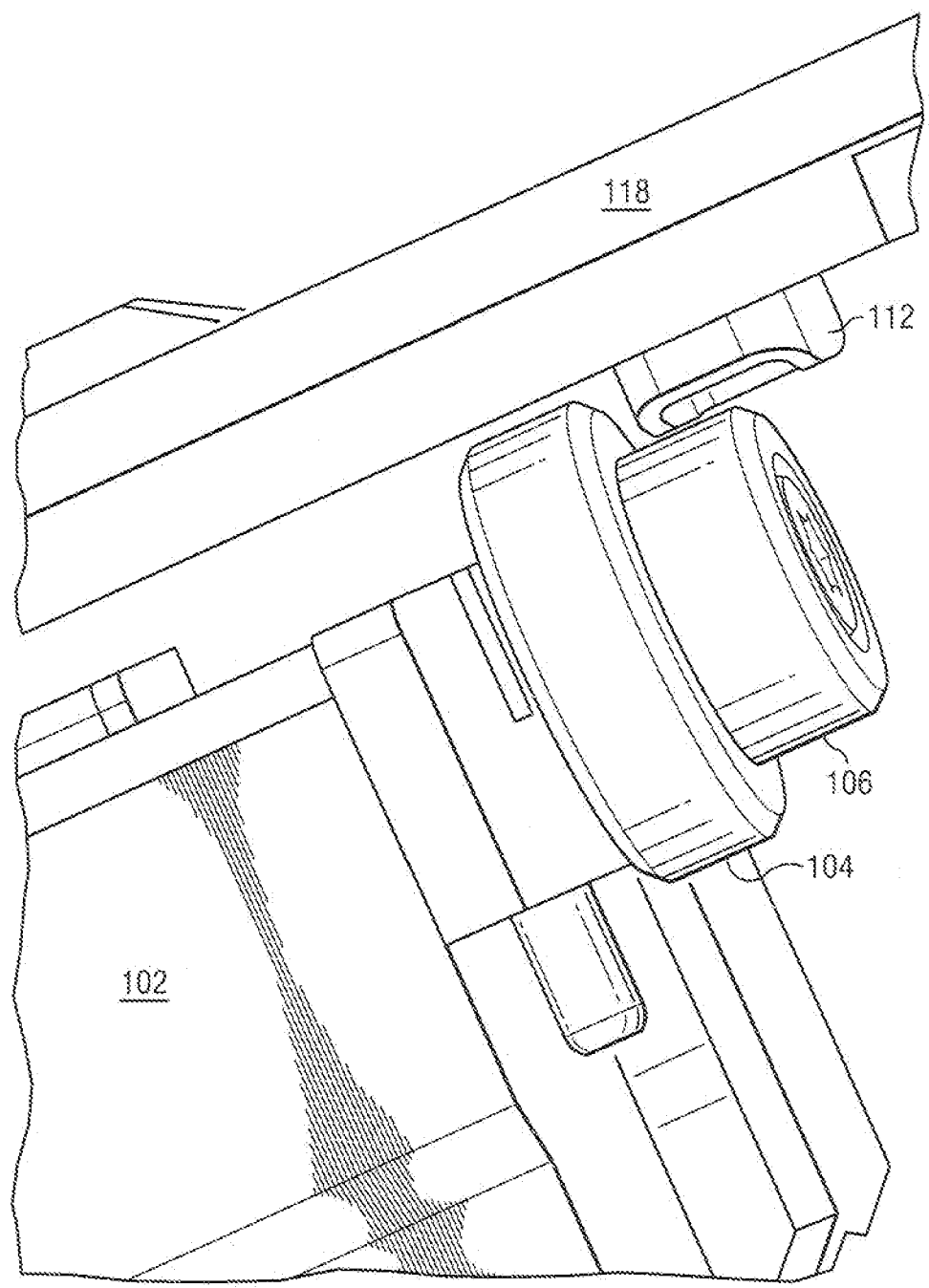
FIG. 2 is an isometric cutaway front view of scanner 100 in an example embodiment of the invention.
Figure 3:
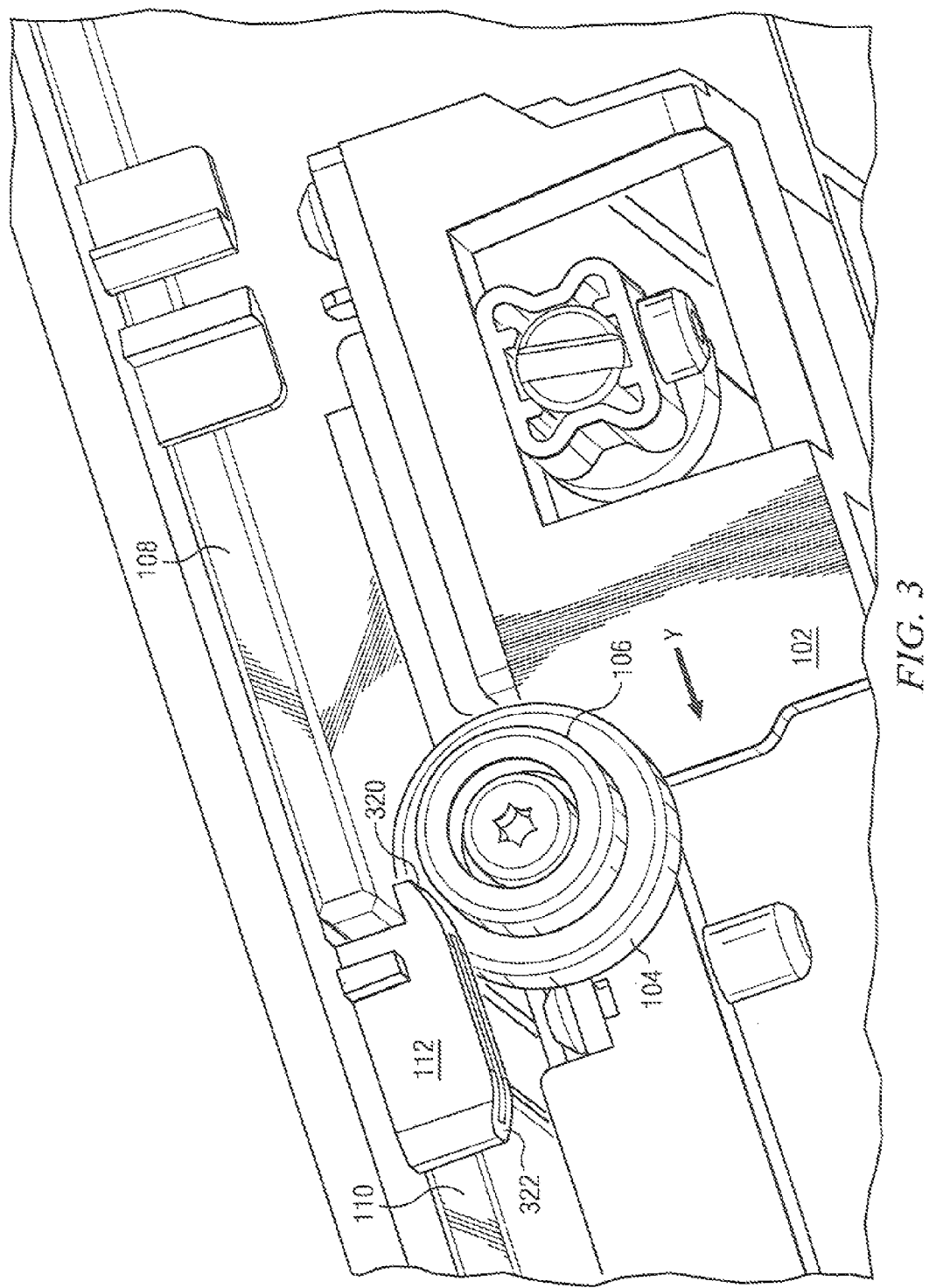
FIG. 3 is another isometric cutaway side view of scanner 100 in an example embodiment of the invention.

FIGS. 1-3, and the following description depict specific examples of the invention. For the purpose of teaching inventive principles, some conventional aspects have been simplified or omitted. Those skilled in the art will appreciate variations from these examples that fall within the scope of the invention. The features described below can be combined in various ways to form multiple variations of the invention. As a result, the invention is not limited to the specific examples described below, but only by the claims and their equivalents.

FIG. 1 is an isometric cutaway side view of a scanner 100 in an example embodiment of the invention. Scanner 100 comprises a scanner module 102, a top cover 118, an ADF glass 110, a flatbed glass 108, two ramps 112, a pair of outer wheels 106 and a pair of inner wheels 104. For clarity, only one wheel of each pair of wheels is shown and only one ramp is shown. The flatbed glass 108 and the ADF glass 110 are mounted to the underside of top cover 118. A gap 114 or space is formed between the end of flatbed glass 108 and the beginning of ADF glass 110. The two ramps 112 are also mounted or formed into the underside of top cover 118 and the ramps are located at the end of the gap 114.

The two pair of wheels are mounted to the scanner module 102, one wheel of each pair mounted on each side of the scanner module 102. In this example the wheels are mounted on a common axis of rotation. The outer pair of wheels 106 have a first diameter and the inner pair of wheels 104 have a second diameter. In this example the outer wheels 106 have a smaller diameter than the inner wheels 104. Whenever the scanner module is performing a scan, the pair of inner wheels are resting on the underside of either the ADF glass 110 or the flatbed glass 108. Scanner module 102 is biased upwards (in direction 116) towards the top cover 118 to maintain good contact between the inner pair of wheels 104 and the underside of the glass.

Scanner 100 has two types of scans, one type of scan is an ADF scan and the other type of scan is a flatbed scan. During an ADF scan the scanner module 102 is positioned under the ADF glass with the inner set of wheels resting on the bottom of the ADF glass 110. The object to be scanned is moved past the scanner module along the top surface of the ADF glass 110. FIG. 1 shows the scanner module 102 in the ADF scan position.

During a flatbed scan the object to be scanned is placed onto the top of flatbed glass 108 and the scan module 102 moves in the Y axis along the length of the flatbed glass 108. As the scanner module moves during the flatbed scan, the pair of inner wheels 104 roll along on the underside of the flatbed glass 108. In each type of scan, the distance between the object to be scanned and the scanner module 102 is controlled by the thickness of the glass and the diameter of the inner wheels. By referencing the scanner module directly to the scanner glass, the mechanical tolerance stack is kept to a minimum and the overall stiffness of the scanner may be reduced. In some examples, the axis of rotation for the two pair of wheels is aligned to the scan line of the scanner module 102.

When switching between a flatbed scan and an ADF scan the scanner module 102 needs to cross over gap 114. The two ramps 112 are located at each end of gap 114. The two ramps 112 are aligned with the outer pair of wheels 106. As scanner module 102 moves from the flatbed glass 108 towards the ADF glass 110, the outer pair of wheels 106 engage the two ramps 112. As the outer pair of wheels 106 engage the two ramps 112, the inner pair of wheels 104 are lifted away from the flatbed glass 108. As the scanner module reaches the other side of gap 114, the outer pair of wheels disengage with the two ramps 112 and the inner set of wheels are lowered onto the bottom surface of the ADF glass 110.

FIG. 2 is an isometric cutaway front view of scanner 100 in an example embodiment of the invention. The scanner module 102 is shown fully engaged with the two ramps (for clarity only one ramp and one of each pair of wheels are shown). Outer wheel 106 is in contact with, and riding on, ramp 112. Inner wheel 104 has been lowered away from the top cover and does not make contact with the top cover, the flatbed glass 108, or the ADF glass 110.

FIG. 3 is another isometric cutaway side view of scanner 100 in an example embodiment of the invention. Scanner module 102 is shown under the flatbed glass 108 just before the outer wheels engage the two ramps 112. Ramps 112 may have a leading edge 320 and a trailing edge 322. The leading edge 320 and trailing edge 322 may be angled or sloped away from the top of ramp 112 to allow outer wheel 106 the ability to engage and disengage with ramp 112 in a smoother fashion.

In one example embodiment of the invention, the ADF glass 110 may be of a different thickness than the flatbed glass 108. For the case of the ADF glass being thinner than the flatbed glass, the two ramps 112 may extend from the gap between the two glasses, all the way to the ADF scanning position. The scanner module 102 would still have the outer pair of wheels 106 riding on the top surface of the two ramps 112 when the scanner module 102 is in the ADF scan position. By remaining on the ramps 112, the scanner module would be located at a different height from the top surfaces of the ADF glass 110 as compared to the height from the top surface of the flatbed glass 108. The change in the height of the scanner module with respect to the top surface of the ADF glass would compensate for the different thickness of the ADF glass 110 and would maintain the proper focus of the scanner module onto the top surface of the ADF glass 110. Therefore the optical path length in the ADF scan position would still be equal to the optical path length in the flatbed scan position.

In the examples describe above, the inner pair of wheels 104 were larger than the outer pair of wheels 106. However, in other example embodiments of the invention, the wheel diameters could be swapped and the ramp height adjusted accordingly.

What is claimed is:

1. A scanner, comprising:
   a flatbed glass and an ADF glass mounted to a top cover with a gap between the flatbed glass and the ADF glass;
   two ramps mounted to the top cover and located at each end of the gap between the flatbed glass and the ADF glass;
   a scanner module having a first pair of wheels aligned along a first axis of rotation wherein the first pair of wheels contact the underside of the flatbed glass during flatbed scans;
   a second pair of wheels mounted to the scanner module, the second pair of wheels riding on the ramps when the scanner module moves towards the ADF glass from the flatbed glass, wherein the first pair of wheels are lifted away from the flatbed glass when the second pair of wheels engage the ramps.

2. The scanner of claim 1, wherein the first pair of wheels and the second pair of wheels have a common axis of rotation.

3. The scanner of claim 2, wherein the common axis of rotation is aligned with a scan line of the scanning module.

4. The scanner of claim 1, wherein the first pair of wheels have a first diameter and the second pair of wheels have a second diameter and the first diameter is larger than the second diameter.

5. The scanner of claim 1, wherein the second pair of wheels disengage the ramps before the scanning module reaches an ADF scanning position and the first pair of wheels are lowered onto a bottom side of the ADF glass as the second pair of wheels disengage the ramps.

6. The scanner of claim 1, wherein the second pair of wheels remain on the ramp when the scanning module reaches an ADF scanning position and the first pair of wheels do not contact the ADF glass.

7. The scanner of claim 6, wherein a thickness of the ADF glass is different than a thickness of the flatbed glass.

8. The scanner of claim 1, wherein each of the two ramps have a leading edge and a trailing edge that allow the second pair of wheels to be raised and lowered to/from a top surface of the ramp as the seamier module moves across the ramps.

9. A method, comprising:
   moving a scanner module from a flatbed scan position to an ADF scan position along a first axis wherein the flatbed scan position is underneath a flatbed glass and the ADF scan position is underneath a separate ADF glass and wherein there is a gap between the flatbed glass and the ADF glass;
   lowering the seamier module away from the flatbed glass along a second axis as the seamier module approaches the gap, wherein the second axis is perpendicular to the first axis;
   maintaining the scanner module position along the second axis as the scanner module moves past the gap and as the scanner module reaches the ADF scan position.

10. The method of claim 9, further comprising:
    raising the scanner module up along the second axis until the scanner module contacts an underside of the ADF glass as the scanner module moves past the gap.

11. A scanner, comprising:
    a flatbed glass and an ADF glass mounted to a top cover with a gap between the flatbed glass and the ADF glass;
    a seaming module having a means for alignment to a top surface of the flatbed glass;
    a means for lifting the scanner module, the means for lifting located at the gap between the flatbed glass and the ADF glass, wherein the means for alignment are lifted away from the flatbed glass as the scanner module moves from a position underneath the flatbed glass to a position underneath the ADF glass.

12. The scanner of claim 11, wherein the means for alignment is lowered onto a bottom side of the ADF glass before the scanning module reaches an ADF scanning position.

13. The scanner of claim 11, wherein the means for alignment does not contact the ADF glass when the scanning module reaches an ADF scanning position.

\* \* \* \* \*

UNITED STATES PATENT AND TRADEMARK OFFICE
CERTIFICATE OF CORRECTION

PATENT NO. : 8,477,388 B2
APPLICATION NO. : 13/180360
DATED : July 2, 2013
INVENTOR(S) : Eric L. Andersen It is certified that error appears in the above-identified patent and that said Letters Patent is hereby corrected as shown below:

In the Claims:

In column 4, line 2, in Claim 8, delete "seamier" and insert -- scanner --, therefor.

In column 4, line 10, in Claim 9, delete "seamier" and insert -- scanner --, therefor.

In column 4, line 11, in Claim 9, delete "seamier" and insert -- scanner --, therefor.

In column 4, line 25, in Claim 11, delete "seaming" and insert -- scanning --, therefor.

Signed and Sealed this
Third Day of September, 2013

Teresa Stanek Rea
*Acting Director of the United States Patent and Trademark Office*